(12) United States Patent
Morris et al.

(10) Patent No.: US 9,297,400 B2
(45) Date of Patent: Mar. 29, 2016

(54) ELASTIC MATING ASSEMBLY AND METHOD OF ELASTICALLY ASSEMBLING MATABLE COMPONENTS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 135 days.

(21) Appl. No.: 13/858,478

(22) Filed: Apr. 8, 2013

(65) Prior Publication Data

US 2014/0301778 A1    Oct. 9, 2014

(51) Int. Cl.
  *F16B 17/00*    (2006.01)
  *F16B 21/20*    (2006.01)
(52) U.S. Cl.
  CPC .............. *F16B 17/002* (2013.01); *F16B 21/20* (2013.01); *Y10T 29/49872* (2015.01); *Y10T 403/3941* (2015.01); *Y10T 403/3981* (2015.01); *Y10T 403/4949* (2015.01)
(58) Field of Classification Search
  CPC .... F16B 17/002; F16B 17/006; F16B 19/002; F16B 19/004; F16B 21/07; F16B 21/078; F16B 21/08; F16B 21/20
  USPC ................. 403/193, 199, 220, 224, 225, 242, 403/DIG. 14, 280; 29/450, 451; 24/604, 24/662, 664
  See application file for complete search history.

(56) References Cited

U.S. PATENT DOCUMENTS

| | | | |
|---|---|---|---|
| 1,219,398 | A | 3/1917 | Huntsman |
| 1,261,036 | A | 4/1918 | Kerns |
| 1,301,302 | A | 4/1919 | Nolan |
| 1,556,233 | A | 10/1925 | Maise |

(Continued)

FOREIGN PATENT DOCUMENTS

| | | | |
|---|---|---|---|
| CN | 1036250 | A | 10/1989 |
| CN | 1129162 | A | 8/1996 |

(Continued)

OTHER PUBLICATIONS

"Coupling Types—Elastic Averaging." MIT. Aug. 3, 2012, [online], [retrieved on Dec. 11, 2014]. Retrieved from the Internet <URL:https://web.archive.org/web/20120308055935/http://pergatory.mit.edu/kinematiccouplings/html/about/elastic_averaging.html >.*

(Continued)

*Primary Examiner* — Josh Skroupa
(74) *Attorney, Agent, or Firm* — Cantor Colburn LLP (57) ABSTRACT

An elastic mating assembly includes a first component comprising a substantially rigid material and an aperture defined by an aperture wall. The assembly also includes an elastically deformable second component having a cutout portion. The elastically deformable second component also includes a second component outer wall removably engaged with the aperture wall, wherein the second component is disposed substantially within the aperture. The elastic mating assembly further includes a third component removably engaged with the cutout portion of the elastically deformable second component, wherein the elastically deformable second component is configured to elastically deform proximate the cutout portion upon contact with an outer surface of the third component.

16 Claims, 3 Drawing Sheets

(56) References Cited

U.S. PATENT DOCUMENTS

| | | | |
|---|---|---|---|
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,482,488 A | 9/1949 | Franc |
| 2,612,139 A | 9/1952 | Collins |
| 2,688,894 A | 9/1954 | Modrey |
| 2,707,607 A | 5/1955 | O'Connor |
| 2,778,399 A | 1/1957 | Mroz |
| 2,780,128 A | 2/1957 | Rapata |
| 2,862,040 A | 11/1958 | Curran |
| 2,902,902 A | 9/1959 | Slone |
| 2,946,612 A | 7/1960 | Ahlgren |
| 3,005,282 A | 10/1961 | Christiansen |
| 3,014,563 A * | 12/1961 | Bratton ................ 403/225 |
| 3,087,352 A | 4/1963 | Daniel |
| 3,089,269 A | 5/1963 | McKiernan |
| 3,130,512 A | 4/1964 | Van Buren, Jr. |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,643,968 A | 2/1972 | Horvath |
| 3,680,272 A | 8/1972 | Meyer |
| 3,842,565 A | 10/1974 | Brown et al. |
| 3,845,961 A | 11/1974 | Byrd, III |
| 3,847,492 A | 11/1974 | Kennicutt et al. |
| 3,895,408 A * | 7/1975 | Leingang ................ 16/2.1 |
| 3,905,570 A | 9/1975 | Nieuwveld |
| 3,972,550 A | 8/1976 | Boughton |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A * | 6/1979 | Herbenar ................ 403/225 |
| 4,169,297 A | 10/1979 | Weihrauch |
| 4,213,675 A | 7/1980 | Pilhall |
| 4,237,573 A | 12/1980 | Weihrauch |
| 4,313,609 A | 2/1982 | Clements |
| 4,318,208 A | 3/1982 | Borja |
| 4,325,574 A | 4/1982 | Umemoto et al. |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,477,142 A | 10/1984 | Cooper |
| 4,481,160 A | 11/1984 | Bree |
| 4,575,060 A | 3/1986 | Kitagawa |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,745,656 A | 5/1988 | Revlett |
| 4,767,647 A | 8/1988 | Bree |
| 4,805,272 A * | 2/1989 | Yamaguchi ................ 24/662 |
| 4,807,335 A | 2/1989 | Candea |
| 4,817,999 A | 4/1989 | Drew |
| 4,819,983 A | 4/1989 | Alexander et al. |
| 4,881,764 A | 11/1989 | Takahashi et al. |
| 4,973,212 A | 11/1990 | Jacobs |
| 4,977,648 A | 12/1990 | Eckerud |
| 5,139,285 A | 8/1992 | Lasinski |
| 5,154,479 A | 10/1992 | Sautter, Jr. |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,297,322 A | 3/1994 | Kraus |
| 5,342,139 A | 8/1994 | Hoffman |
| 5,368,797 A | 11/1994 | Quentin et al. |
| 5,397,206 A * | 3/1995 | Sihon ................ 411/544 |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A * | 7/1996 | Pawlick ................ 165/153 |
| 5,556,808 A | 9/1996 | Williams et al. |
| 5,575,601 A | 11/1996 | Skufca |
| 5,577,301 A | 11/1996 | DeMaagd |
| 5,577,779 A | 11/1996 | Dangel |
| 5,580,204 A | 12/1996 | Hultman |
| 5,586,372 A | 12/1996 | Eguchi et al. |
| 5,601,453 A | 2/1997 | Horchler |
| 5,634,757 A | 6/1997 | Schanz |
| 5,657,516 A | 8/1997 | Berg et al. |
| 5,667,271 A | 9/1997 | Booth |
| 5,670,013 A | 9/1997 | Huang et al. |
| 5,698,276 A | 12/1997 | Mirabitur |
| 5,736,221 A | 4/1998 | Hardigg et al. |
| 5,765,942 A | 6/1998 | Shirai et al. |
| 5,795,118 A | 8/1998 | Osada et al. |
| 5,797,170 A | 8/1998 | Akeno |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,941,673 A | 8/1999 | Hayakawa et al. |
| 6,073,315 A | 6/2000 | Rasmussen |
| 6,095,594 A | 8/2000 | Riddle et al. |
| 6,164,603 A | 12/2000 | Kawai |
| 6,193,430 B1 | 2/2001 | Culpepper et al. |
| 6,202,962 B1 | 3/2001 | Snyder |
| 6,209,175 B1 | 4/2001 | Gershenson |
| 6,209,178 B1 | 4/2001 | Wiese et al. |
| 6,264,869 B1 | 7/2001 | Notarpietro et al. |
| 6,299,478 B1 | 10/2001 | Jones et al. |
| 6,321,495 B1 | 11/2001 | Oami |
| 6,349,904 B1 | 2/2002 | Polad |
| 6,354,815 B1 | 3/2002 | Svihla et al. |
| 6,378,931 B1 | 4/2002 | Kolluri et al. |
| 6,398,449 B1 | 6/2002 | Loh |
| 6,484,370 B2 | 11/2002 | Kanie et al. |
| 6,485,241 B1 * | 11/2002 | Oxford ................ 411/339 |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,658,698 B2 | 12/2003 | Chen |
| 6,662,411 B2 | 12/2003 | Rubenstein |
| 6,664,470 B2 | 12/2003 | Nagamoto |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,799,758 B2 | 10/2004 | Fries |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,908,117 B1 | 6/2005 | Pickett, Jr. et al. |
| 6,932,416 B2 | 8/2005 | Clauson |
| 6,948,753 B2 | 9/2005 | Yoshida et al. |

(56) References Cited

U.S. PATENT DOCUMENTS

| | | | |
|---|---|---|---|
| 6,951,349 B2 | 10/2005 | Yokota | |
| 6,959,954 B2 | 11/2005 | Brandt et al. | |
| 6,966,601 B2 | 11/2005 | Matsumoto et al. | |
| 6,971,831 B2 | 12/2005 | Fattori et al. | |
| 6,997,487 B2 | 2/2006 | Kitzis | |
| 7,000,941 B2 | 2/2006 | Yokota | |
| 7,008,003 B1 | 3/2006 | Hirose et al. | |
| 7,014,094 B2 | 3/2006 | Alcoe | |
| 7,017,239 B2 | 3/2006 | Kurily et al. | |
| 7,036,779 B2 | 5/2006 | Kawaguchi et al. | |
| 7,055,849 B2 | 6/2006 | Yokota | |
| 7,059,628 B2 | 6/2006 | Yokota | |
| 7,073,260 B2 | 7/2006 | Jensen | |
| 7,089,998 B2 * | 8/2006 | Crook | 165/79 |
| 7,097,198 B2 | 8/2006 | Yokota | |
| 7,121,611 B2 | 10/2006 | Hirotani et al. | |
| 7,144,183 B2 | 12/2006 | Lian et al. | |
| 7,172,210 B2 | 2/2007 | Yokota | |
| 7,178,855 B2 | 2/2007 | Catron et al. | |
| 7,198,315 B2 | 4/2007 | Cass et al. | |
| 7,234,852 B2 | 6/2007 | Nishizawa et al. | |
| 7,306,418 B2 | 12/2007 | Kornblum | |
| 7,322,500 B2 | 1/2008 | Maierholzner | |
| 7,344,056 B2 | 3/2008 | Shelmon et al. | |
| 7,360,964 B2 | 4/2008 | Tsuya | |
| 7,369,408 B2 | 5/2008 | Chang | |
| 7,435,031 B2 | 10/2008 | Granata | |
| 7,454,105 B2 | 11/2008 | Yi | |
| 7,487,884 B2 | 2/2009 | Kim | |
| 7,493,716 B2 | 2/2009 | Brown | |
| 7,557,051 B2 | 7/2009 | Ryu et al. | |
| 7,568,316 B2 | 8/2009 | Choby et al. | |
| D602,349 S | 10/2009 | Andersson | |
| 7,672,126 B2 | 3/2010 | Yeh | |
| 7,677,650 B2 | 3/2010 | Huttenlocher | |
| 7,764,853 B2 | 7/2010 | Yi et al. | |
| 7,793,998 B2 | 9/2010 | Matsui et al. | |
| 7,802,831 B2 | 9/2010 | Isayama et al. | |
| 7,828,372 B2 | 11/2010 | Ellison | |
| 7,862,272 B2 | 1/2011 | Nakajima | |
| 7,869,003 B2 | 1/2011 | Van Doren et al. | |
| 7,883,137 B2 | 2/2011 | Bar | |
| 7,922,415 B2 | 4/2011 | Rudduck et al. | |
| 7,946,684 B2 | 5/2011 | Drury et al. | |
| 8,029,222 B2 | 10/2011 | Nitsche | |
| 8,061,861 B2 | 11/2011 | Paxton et al. | |
| 8,101,264 B2 | 1/2012 | Pace et al. | |
| 8,136,819 B2 | 3/2012 | Yoshitsune et al. | |
| 8,162,375 B2 | 4/2012 | Gurtatowski et al. | |
| 8,203,496 B2 | 6/2012 | Miller et al. | |
| 8,203,843 B2 | 6/2012 | Chen | |
| 8,261,581 B2 | 9/2012 | Cerruti et al. | |
| 8,276,961 B2 | 10/2012 | Kwolek | |
| 8,297,137 B2 | 10/2012 | Dole | |
| 8,297,661 B2 | 10/2012 | Proulx et al. | |
| 8,414,048 B1 | 4/2013 | Kwolek | |
| 8,444,199 B2 | 5/2013 | Takeuchi et al. | |
| 8,677,573 B2 | 3/2014 | Lee | |
| 8,695,201 B2 | 4/2014 | Morris | |
| 8,720,016 B2 | 5/2014 | Beaulieu | |
| 8,726,473 B2 | 5/2014 | Dole | |
| 8,826,499 B2 | 9/2014 | Tempesta | |
| 8,833,832 B2 | 9/2014 | Whipps | |
| 8,834,058 B2 | 9/2014 | Woicke | |
| 9,039,318 B2 | 5/2015 | Mantei et al. | |
| 9,050,690 B2 | 6/2015 | Hammer et al. | |
| 9,061,715 B2 | 6/2015 | Morris | |
| 9,067,625 B2 | 6/2015 | Morris | |
| 2001/0030414 A1 | 10/2001 | Yokota | |
| 2001/0045757 A1 | 11/2001 | Kanie et al. | |
| 2002/0045086 A1 | 4/2002 | Tsuji et al. | |
| 2002/0060275 A1 | 5/2002 | Polad | |
| 2002/0092598 A1 | 7/2002 | Jones et al. | |
| 2002/0136617 A1 | 9/2002 | Imahigashi | |
| 2003/0007831 A1 | 1/2003 | Lian et al. | |
| 2003/0080131 A1 | 5/2003 | Fukuo | |
| 2003/0082986 A1 | 5/2003 | Wiens et al. | |
| 2003/0087047 A1 | 5/2003 | Blauer | |
| 2003/0108401 A1 | 6/2003 | Agha et al. | |
| 2003/0180122 A1 | 9/2003 | Dobson | |
| 2004/0037637 A1 | 2/2004 | Lian et al. | |
| 2004/0131896 A1 | 7/2004 | Blauer | |
| 2004/0139678 A1 | 7/2004 | Pervan | |
| 2004/0140651 A1 | 7/2004 | Yokota | |
| 2004/0208728 A1 | 10/2004 | Fattori et al. | |
| 2005/0016116 A1 | 1/2005 | Scherff | |
| 2005/0031946 A1 | 2/2005 | Kruger et al. | |
| 2005/0054229 A1 | 3/2005 | Tsuya | |
| 2005/0082449 A1 | 4/2005 | Kawaguchi et al. | |
| 2005/0156409 A1 | 7/2005 | Yokota | |
| 2005/0156410 A1 | 7/2005 | Yokota | |
| 2005/0156416 A1 | 7/2005 | Yokota | |
| 2005/0244250 A1 | 11/2005 | Okada et al. | |
| 2006/0102214 A1 | 5/2006 | Clemons | |
| 2006/0110109 A1 | 5/2006 | Yi et al. | |
| 2006/0113755 A1 | 6/2006 | Yokota | |
| 2006/0141318 A1 | 6/2006 | MacKinnon et al. | |
| 2006/0197356 A1 | 9/2006 | Catron et al. | |
| 2006/0202449 A1 | 9/2006 | Yokota | |
| 2006/0237995 A1 | 10/2006 | Huttenlocher | |
| 2006/0249520 A1 | 11/2006 | Demonte | |
| 2006/0264076 A1 | 11/2006 | Chen | |
| 2007/0040411 A1 | 2/2007 | Dauvergne | |
| 2007/0113483 A1 | 5/2007 | Hernandez | |
| 2007/0113485 A1 | 5/2007 | Hernandez | |
| 2007/0126211 A1 | 6/2007 | Moerke et al. | |
| 2007/0144659 A1 | 6/2007 | De La Fuente | |
| 2007/0292205 A1 | 12/2007 | Duval | |
| 2008/0014508 A1 | 1/2008 | Van Doren et al. | |
| 2008/0018128 A1 | 1/2008 | Yamagiwa et al. | |
| 2008/0073888 A1 | 3/2008 | Enriquez | |
| 2008/0094447 A1 | 4/2008 | Drury et al. | |
| 2008/0128346 A1 | 6/2008 | Bowers | |
| 2008/0217796 A1 | 9/2008 | Van Bruggen et al. | |
| 2008/0260488 A1 | 10/2008 | Scroggie et al. | |
| 2009/0028506 A1 | 1/2009 | Yi et al. | |
| 2009/0072591 A1 | 3/2009 | Baumgartner | |
| 2009/0091156 A1 | 4/2009 | Neubrand | |
| 2009/0134652 A1 | 5/2009 | Araki | |
| 2009/0141449 A1 | 6/2009 | Yeh | |
| 2009/0174207 A1 | 7/2009 | Lota | |
| 2009/0265896 A1 | 10/2009 | Beak | |
| 2010/0001539 A1 | 1/2010 | Kikuchi et al. | |
| 2010/0021267 A1 | 1/2010 | Nitsche | |
| 2010/0061045 A1 | 3/2010 | Chen | |
| 2010/0102538 A1 | 4/2010 | Paxton et al. | |
| 2010/0134128 A1 | 6/2010 | Hobbs | |
| 2010/0147355 A1 | 6/2010 | Shimizu et al. | |
| 2010/0247034 A1 | 9/2010 | Yi et al. | |
| 2010/0270745 A1 | 10/2010 | Hurlbert et al. | |
| 2011/0012378 A1 | 1/2011 | Ueno et al. | |
| 2011/0076588 A1 | 3/2011 | Yamaura | |
| 2011/0119875 A1 | 5/2011 | Iwasaki | |
| 2011/0131918 A1 | 6/2011 | Glynn | |
| 2011/0175376 A1 | 7/2011 | Whitens et al. | |
| 2011/0207024 A1 | 8/2011 | Bogumil et al. | |
| 2011/0239418 A1 | 10/2011 | Huang | |
| 2011/0296764 A1 | 12/2011 | Sawatani et al. | |
| 2011/0311332 A1 | 12/2011 | Ishman | |
| 2012/0020726 A1 | 1/2012 | Jan | |
| 2012/0073094 A1 | 3/2012 | Bishop | |
| 2012/0115010 A1 | 5/2012 | Smith et al. | |
| 2012/0240363 A1 | 9/2012 | Lee | |
| 2012/0251226 A1 | 10/2012 | Liu et al. | |
| 2012/0261951 A1 | 10/2012 | Mildner et al. | |
| 2012/0321379 A1 | 12/2012 | Wang et al. | |
| 2013/0019454 A1 | 1/2013 | Colombo et al. | |
| 2013/0019455 A1 | 1/2013 | Morris | |
| 2013/0027852 A1 | 1/2013 | Wang | |
| 2013/0071181 A1 | 3/2013 | Herzinger et al. | |
| 2013/0157015 A1 | 6/2013 | Morris | |
| 2013/0212858 A1 | 8/2013 | Herzinger et al. | |
| 2013/0269873 A1 | 10/2013 | Herzinger et al. | |
| 2013/0287992 A1 | 10/2013 | Morris | |

(56) References Cited

U.S. PATENT DOCUMENTS

| | | |
|---|---|---|
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0175774 A1 | 6/2014 | Kansteiner |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2015/0069779 A1 | 3/2015 | Morris et al. |

FOREIGN PATENT DOCUMENTS

| | | |
|---|---|---|
| CN | 1205285 A | 1/1999 |
| CN | 1328521 A | 12/2001 |
| CN | 1426872 A | 7/2003 |
| CN | 2661972 Y | 12/2004 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2888807 Y | 4/2007 |
| CN | 2915389 Y | 6/2007 |
| CN | 101250964 A | 4/2008 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 201703439 U | 1/2011 |
| CN | 201737062 U | 2/2011 |
| CN | 201792722 U | 4/2011 |
| CN | 201890285 U | 7/2011 |
| CN | 102144102 A | 8/2011 |
| CN | 202079532 U | 12/2011 |
| CN | 102313952 A | 1/2012 |
| CN | 102756633 | 10/2012 |
| CN | 202686206 U | 1/2013 |
| DE | 1220673 B | 7/1966 |
| DE | 2736012 A1 | 2/1978 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10234253 B3 | 4/2004 |
| DE | 102008005618 A1 | 7/2009 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 1132263 A1 | 9/2001 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2958696 A1 | 10/2011 |
| GB | 2281950 A | 3/1995 |
| JP | 2001171554 A | 6/2001 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| WO | 2008140659 A1 | 11/2008 |
| WO | 2013191622 A1 | 12/2013 |

OTHER PUBLICATIONS

"Elastic Averaging in Flexture Mechanisms: A Multi-Beam Paralleaogram Flexture Case-Study" by Shorya Awtar and Edip Sevincer, Proceedings of IDETC/CIE 2006, Paper DETC2006-99752, American Society of Mechanical Engineers (ASME), Sep. 2006.

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, vol. 26, No. 3, Elsevier Publishing, Jul. 2002.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

"Passive Alignment of Micro-Fluidic Chips Using the Principle of Elastic Averaging" by Sitanshu Gurung, Thesis, Louisiana State University, Dept. Of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

U.S. Appl. No. 13/2299,26, filed on Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.

U.S. Appl. No. 13/330,718, filed Dec. 20, 2011, entitled "Precisely Locating Components in an Infrared Welded Assembly", inventor: Steven E. Morris.

U.S. Appl. No. 13/459,118, filed on Apr. 28, 2012, entitled "Stiffened Multi-Layer Compartment Door Assembly Utilizing Elastic Averaging," inventor: Steven E. Morris.

U.S. Appl. No. 13/567,580, filed on Aug. 6, 2012, entitled "Semi-Circular Alignment Features of an Elastic Averaging Alignment System", inventors: Steven E. Morris and Thomas F. Bowles.

U.S. Appl. No. 13/570,959, filed on Aug. 9, 2012, entitled "Elastic Cantilever Beam Alignment System for Precisely Aligning Components", inventor: Steven E. Morris.

U.S. Appl. No. 13/571,030, filed on Aug. 9, 2012, entitled "Elastic Tube Alignment System for Precisely Locating an Emblem Lens to an Outer Bezel", inventors: Joel Colombo, Steven E. Morris, and Michael D. Richardson.

U.S. Appl. No. 13/752,449, filed on Jan. 29, 2013, entitled "Elastic Insert Alignment Assembly and Method of Reducing Positional Variation", inventors: Steven E. Morris and Michael D. Richardson.

U.S. Appl. No. 13/755,759, filed on Jan. 31, 2013, entitled "Elastic Alignment Assembly for Aligning Mated Components and Method of Reducing Positional Variation", inventors: Joel Colombo, Michael D. Richardson, and Steven E. Morris.

U.S. Appl. No. 13/851,222, filed on Mar. 27, 2013, entitled "Elastically Averaged Alignment System ", inventors: Joel Colombo and Steven E Morris.

U.S. Appl. No. 13/855,928, filed on Apr. 3, 2013, entitled "Elastic Averaging Alignment System, Method of Making the Same and Cutting Punch Therefor ", inventors: Steven E. Morris, Jennifer P. Lawall, Joel Colombo, and Jeffrey L. Konchan.

(56) References Cited

OTHER PUBLICATIONS

U.S. Appl. No. 13/856,888, filed on Apr. 4, 2013, entitled "Elastic Retaining Assembly for Matable Components and Method of Assembling", inventors: Steven E. Morris, Jennifer P. Lawall, Joel Colombo, and Toure D. Lee.
U.S. Appl. No. 13/856,927, filed on Apr. 4, 2013, entitled "Elastic Tubular Attachment Assembly for Mating Components and Method of Mating Components ", inventors: Steven E. Morris and Jennifer P. Lawall.
U.S. Appl. No. 13/856,956, filed on Apr. 4, 2013, entitled "Elastic Clip Retaining Arrangement and Method of Mating Structures with an Elastic Clip Retaining Arrangement ", inventors: Joel Colombo, Steven E. Morris and Jeffrey L. Konchan.
U.S. Appl. No. 13/856,973, filed on Apr. 4, 2013, entitled "Elastically Deformable Flange Locator Arrangement and Method of Reducing Positional Variation ", inventors: Joel Colombo, Steven E. Morris and Michael D. Richardson.
U.S. Appl. No. 13/858,478, filed on Apr. 8, 2013, entitled "Elastic Mating Assembly and Method of Elastically Assembling Matable Components", inventors: Steven E. Morris and Jennifer P. Lawall.
U.S. Appl. No. 13/859,109, filed on Apr. 9, 2013, entitled "Elastic Retaining Arrangement for Jointed Components and Method of Reducing a Gap Between Jointed Components," inventors: Steven E. Morris, James M. Kushner, Victoria L. Enyedy, Jennifer P. Lawall, and Piotr J. Ogonek.
U.S. Appl. No. 13/915,132, filed on Jun. 11, 2013, entitled "Elastically Deformable Energy Management Arrangement and Method of Managing Energy Absorption," inventors: Steven E. Morris, Randy A. Johnson and Jennifer P. Lawall.
U.S. Appl. No. 13/915,177, filed on Jun. 11, 2013, entitled "Elastically Deformable Energy Management Assembly and Method of Managing Energy Absorption," inventors: Steven E. Morris, Jennifer P. Lawall, and Randy Johnson.
U.S. Appl. No. 13/917,005, filed on Jun. 13, 2013, entitled "Elastic Attachment Assembly and Method of Reducing Positional Variation and Increasing Stiffness," inventors: Steven E. Morris and Jennifer P. Lawall.
U.S. Appl. No. 13/917,074, filed on Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.
U.S. Appl. No. 13/918,183, filed on Jun. 14, 2013, entitled "Elastic Retaining Assembly for Matable Components and Method of Assembling," inventors: Steven E. Morris and Jennifer P. Lawall.
U.S. Appl. No. 13/939,503, filed on Jul. 11, 2013, entitled "Elastically Averaged Alignment Systems and Methods," inventor: Joel Colombo.
U.S. Appl. No. 13/940,912, filed on Jul. 12, 2013, entitled "Alignment Arrangement for Mated Components and Method", inventors: Steven E. Morris and Jennifer P. Lawall.
U.S. Appl. No. 13/945,231, filed on Jul. 18, 2013, entitled "Lobular Elastic Tube Alignment System for Providing Precise Four-Way Alignment of Components", Inventors: Steven E. Morris and Jennifer P. Lawall.
U.S. Appl. No. 13/954,198, filed on Jul. 30, 2013, entitled "Elastic Alignment and Retention System and Method," inventors: Steven E. Morris, Edward D. Groninger, and Raymond J. Chess.
U.S. Appl. No. 13/966,523, filed on Aug. 14, 2013, entitled "Elastically Averaged Alignment Systems and Methods Thereof," inventors: Steven E. Morris, Jennifer P. Lawall and Joel Colombo.
U.S. Appl. No. 13/973,587, filed on Aug. 22, 2013, entitled "Elastic Averaging Alignment System and Method," inventors: Steven E. Morris and Jennifer P. Lawall.
U.S. Appl. No. 13/974,729, filed on Aug. 23, 2013, entitled "Elastic Averaging Snap Member Aligning and Fastening System", inventors: Steven E. Morris and Jennifer P. Lawall.
U.S. Appl. No. 14/012,205, filed on Aug. 28, 2013, entitled "Elastically Deformable Alignment Fastener and System," inventors: Steven E. Morris, Marc J. Tahnoose, Michael E. McGuire and Jennifer P. Lawall.
U.S. Appl. No. 14/021,282, filed on Sep. 9, 2013, entitled "Elastic Tube Alignment and Fastening System for Providing Precise Alignment and Fastening of Components," inventors: Steven E. Morris and Jennifer P. Lawall.
U.S. Appl. No. 14/031,647, filed on Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.
U.S. Appl. No. 14/038,241, filed on Sep. 26, 2013, entitled "Serviceable Aligning and Self-Retaining Elastic Arrangement for Mated Components and Method," inventors: Steven E. Morris, Jennifer P. Lawall and Joel Colombo.
U.S. Appl. No. 14/039,614, filed on Sep. 27, 2013, entitled "Elastically Averaged Alignment Systems and Methods," inventor: Steven E. Morris.
U.S. Appl. No. 14/044,199, filed on Oct. 2, 2013, entitled "Lobular Elastic Tube Alignment and Retention System for Providing Precise Alignment of Components," inventors: Steven E. Morris and Jennifer P. Lawall.
U.S. Appl. No. 14/044,207, filed on Oct. 2, 2013, entitled "Elastic Aperture Alignment System for Providing Precise Four-Way Alignment of Components," inventors: Steven E. Morris and Jennifer P. Lawall.
U.S. Appl. No. 14/045,463, filed on Oct. 3, 2013, entitled "Elastically Averaged Alignment Systems and Methods," inventors: Steven E. Morris and Jennifer P. Lawall.
U.S. Appl. No. 14/081,361, filed on Nov. 15, 2013, entitled "Elastically Deformable Clip and Method," inventors: Steven E. Morris, Jennifer P. Lawall and Jeffrey M. Gace.
U.S. Appl. No. 14/104,321, filed on Dec. 12, 2013, entitled "Alignment and Retention System for a Flexible Assembly," inventors: Steven E. Morris and Jennifer P. Lawall.
U.S. Appl. No. 14/104,327, filed on Dec. 12, 2013, entitled "Self-Retaining Alignment System for Providing Precise Alignment and Retention of Components," inventors: Steven E. Morris, Jennifer P. Lawall and Toure D. Lee.
U.S. Appl. No. 14/104,333, filed on Dec. 12, 2013, entitled "Alignment System for Providing Precise Alignment and Retention of Components of a Sealable Compartment, " inventors: Steven E. Morris, Christopher J. Georgi, Jennifer P. Lawall and Gordan N. Noll.
U.S. Appl. No. 14/104,541, filed on Dec. 12, 2013, entitled "Alignment and Retention System for Providing Precise Alignment and Retention of Components," inventors: Steven E. Morris and Jennifer P. Lawall.
U.S. Appl. No. 14/104,549, filed on Dec. 12, 2013, entitled "Alignment System for Providing Alignment of Components Having Contoured Features," inventors: Steven E. Morris and Jennifer P. Lawall.
U.S. Appl. No. 14/108,921, filed on Dec. 17, 2013, entitled "Elastically Averaged Alignment Systems and Methods Thereof," inventors: Steven E. Morris and Jennifer P. Lawall.
U.S. Appl. No. 14/108,931, filed on Dec. 17, 2013, entitled "Elastically Averaged Strap Systems and Methods," inventors: Steven E. Morris and Jennifer P. Lawall.
U.S. Appl. No. 14/109,296, filed on Dec. 17, 2013, entitled "Fastener for Operatively Coupling Matable Components, " inventors: Steven E. Morris and Jennifer P. Lawall.
U.S. Appl. No. 14/134,622, filed on Dec. 19, 2013, entitled "Elastic Averaging Alignment Member," inventors: Steven E. Morris and Jennifer P. Lawall.
U.S. Appl. No. 14/134,801, filed on Dec. 19, 2013, entitled "Elastically Averaged Alignment Systems and Methods," inventors: Steven E. Morris and Jennifer P. Lawall.
U.S. Appl. No. 14/134,844, filed on Dec. 19, 2013, entitled "Elastically Deformable Module Installation Assembly," inventors: Steven E. Morris and Jennifer P. Lawall.
U.S. Appl. No. 14/134,888, filed on Dec. 19, 2013, entitled "Elastic Retaining Assembly and Method," inventors: Steven E. Morris and Jennifer P. Lawall.
U.S. Appl. No. 14/136,502, filed on Dec. 20, 2013, entitled "Elastically Averaged Alignment Systems and Methods," inventors: Timothy A. Kiester, Steven E. Morris, Kenton L. West, Scott J. Fast, and Evan Phillips.

(56) References Cited

OTHER PUBLICATIONS

U.S. Appl. No. 14/151,279, filed on Jan. 9, 2014, entitled "Elastically Averaged Alignment Systems and Methods," inventors: Steven E. Morris and Jennifer P. Lawall.

U.S. Appl. No. 14/153,741, filed on Jan. 13, 2014, entitled "Elastically Averaged Assembly for Closure Applications," inventors: Steven E. Morris, Jeffrey A. Abell, Jennifer P. Lawall, and Jeffrey L. Konchan.

U.S. Appl. No. 14/180,882, filed on Feb. 14, 2014, entitled "Elastic Tube Alignment System for Precisely Locating Components," inventor: Steven E. Morris.

U.S. Appl. No. 14/181,142, filed on Feb. 14, 2014, entitled "Elastic Tube Alignment System for Precisely Locating Components," inventor: Steven E. Morris.

U.S. Appl. No. 14/185,422, filed on Feb. 20, 2014, entitled "Elastically Averaged Alignment Systems and Methods," inventors: Joel Colombo, Steven E. Morris, Jennifer P. Lawall and Ashish M. Gollapalli.

U.S. Appl. No. 14/185,472, filed on Feb. 20, 2014, entitled "Elastically Averaged Alignment Systems and Method," inventors: Steven E. Morris, Jennifer P. Lawall and Kee Hyuk Im.

U.S. Appl. No. 14/231,395, filed on Mar. 31, 2014, entitled "Elastically Averaged Alignment Systems and Methods," inventors: Joel Colombo, Steven E. Morris, Jennifer P. Lawall, and Ashish M. Gollapalli.

U.S. Appl. No. 14/249,746, filed on Apr. 10, 2014, entitled "Elastically Averaged Alignment Systems and Methods," inventors: Joel Colombo and Catherine A. Ostrander.

U.S. Appl. No. 14/259,747, filed on Apr. 23, 2014, entitled "System for Elastically Averaging Assembly of Components," inventors: Steven E. Morris and Jennifer P. Lawall.

Cross-sectional view of a prior art infrared welded assembly of BMW, Munich, Germany. Believed on the market since about Jan. 1, 2010.

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

\* cited by examiner

ELASTIC MATING ASSEMBLY AND METHOD OF ELASTICALLY ASSEMBLING MATABLE COMPONENTS

FIELD OF THE INVENTION

The present invention relates to matable components, and more particularly to an elastic mating assembly, as well as a method of elastically assembling such components.

BACKGROUND

Currently, components which are to be mated together in a manufacturing process are subject to positional variation based on the mating arrangements between the components. One common arrangement includes components mutually located with respect to each other by 2-way and/or 4-way male alignment features; typically undersized structures which are received into corresponding oversized female alignment features such as apertures in the form of openings and/or slots. Alternatively, double-sided tape, adhesives or welding processes may be employed to mate parts. Irrespective of the precise mating arrangement, there is a clearance between at least a portion of the alignment features which is predetermined to match anticipated size and positional variation tolerances of the mating features as a result of manufacturing (or fabrication) variances. As a result, occurrence of significant positional variation between the mated components is possible, which may contribute to the presence of undesirably large and varying gaps and otherwise poor fit. The clearance between the aligning and attaching features may lead to relative motion between mated components, which contributes to poor perceived quality. Additional undesirable effects include squeaking and rattling of the mated components, for example.

SUMMARY OF THE INVENTION

In one exemplary embodiment, an elastic mating assembly includes a first component comprising a substantially rigid material and an aperture defined by an aperture wall. The assembly also includes an elastically deformable second component having a cutout portion. The elastically deformable second component also includes a second component outer wall removably engaged with the aperture wall, wherein the second component is disposed substantially within the aperture. The elastic mating assembly further includes a third component removably engaged with the cutout portion of the elastically deformable second component, wherein the elastically deformable second component is configured to elastically deform proximate the cutout portion upon contact with an outer surface of the third component.

In another exemplary embodiment, a method of elastically assembling matable components is provided. The method includes engaging a first component comprising a substantially rigid material with an elastically deformable second component comprising an elastically deformable material proximate an aperture wall of the first component. The method also includes inserting a third component into a cutout portion of the elastically deformable second component, wherein the elastically deformable second component and third component form a contact interference proximate an outer surface of the third component and a cutout portion edge of the cutout portion. The method further includes elastically deforming the elastically deformable second component proximate the cutout portion edge of the cutout portion upon contact with the outer surface of the third component.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
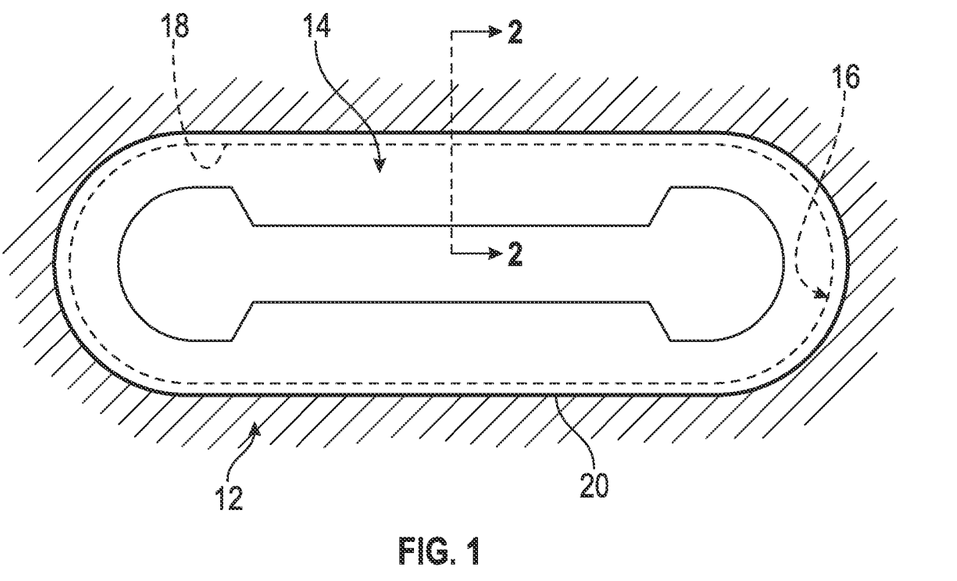
FIG. 1 is a plan view of an elastic mating assembly.
Figure 2:
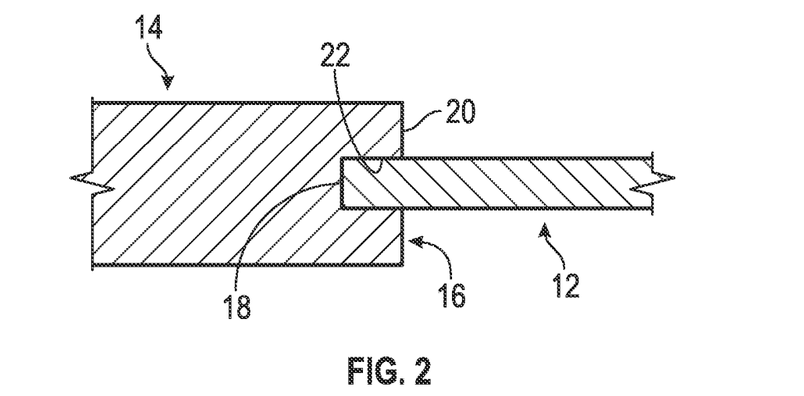
FIG. 2 is a cross-sectional view taken along line 2-2, illustrating engagement between a first component and a second component of the elastic mating assembly.

Referring to FIGS. 1 and 2, an elastic mating assembly 10 is illustrated. The elastic mating assembly 10 comprises matable components, such as a first component 12 and an elastically deformable second component 14 that are configured to be engaged with each other. In one embodiment, the elastic mating assembly 10 is employed in a vehicle application. However, it is to be understood that the components may be associated with numerous other applications and industries, such as home appliance and aerospace applications, for example.

The first component 12 is formed of a substantially rigid material, such as sheet metal, for example, while the elastically deformable second component 14 is at least partially formed of an elastically deformable material, which will be described in detail below. The elastically deformable nature of the elastically deformable second component 14 provides an insert having a compliant interface for components to indirectly mate or couple with the first component 12.

In an engaged position, the elastically deformable second component 14 is substantially disposed within an aperture 16 of the first component 12 that is defined by an aperture wall 18. The elastically deformable second component 14 includes a second component outer wall 20 that engages the first component 12 proximate the aperture wall 18. Engagement between the first component 12 and the elastically deformable second component 14 may be facilitated by numerous contemplated coupling structures that provide removable engagement between the components. One such structure includes a tongue-and-groove arrangement. As shown in FIG. 2, the second component outer wall 20 includes a perimeter notch 22 extending around the second component outer wall 20, with the perimeter notch 22 configured to fittingly receive the aperture wall 18 therein. Alternatively, the aperture wall 18 of the first component 12 may include a notch configured to fittingly receive at least a portion of the second component outer wall 20 therein. Either arrangement, or a combination thereof, provides a "snap-fit" engagement between the first component 12 and the elastically deformable second component 14. As noted above, it is contemplated that the elastically deformable second component 14 is removably engaged within the aperture 16 of the first component 12, thereby providing interchangeable flexibility between inserted elastically deformable second components, as well as providing the ability to incorporate the elastically deformable second component 14 into existing first components as an add-on feature.

Figure 3:
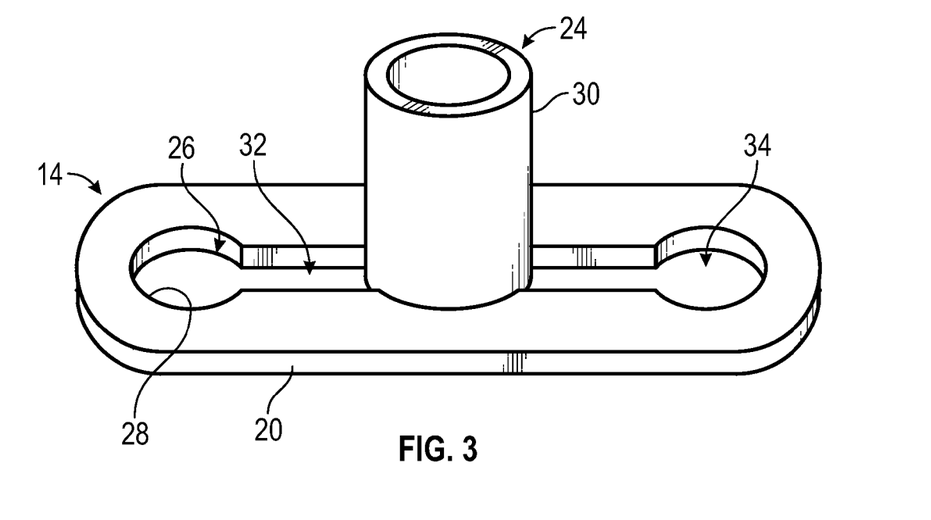
FIG. 3 is a perspective view of engagement between the second component and a third component of the elastic mating assembly.
Figure 3A:
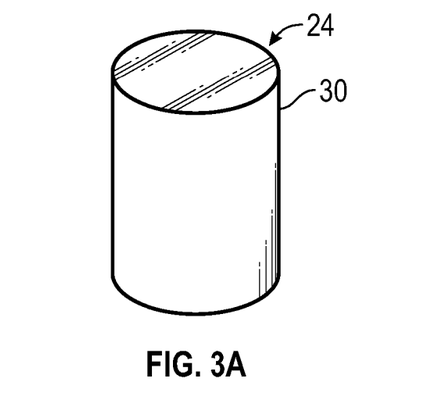
FIG. 3A is a perspective view of the third component of the elastic mating assembly according to another aspect of the disclosure.

Referring to FIG. 3, the elastically deformable second component 14 is employed as an intermediary between the first component 12 (FIG. 1) and a third component 24 that is to be mated and aligned with the first component 12. More specifically, the third component 24 is a male portion that may extend from countless structures or components (not illustrated) that are to be mated and aligned with the first component 12.

Figure 4:
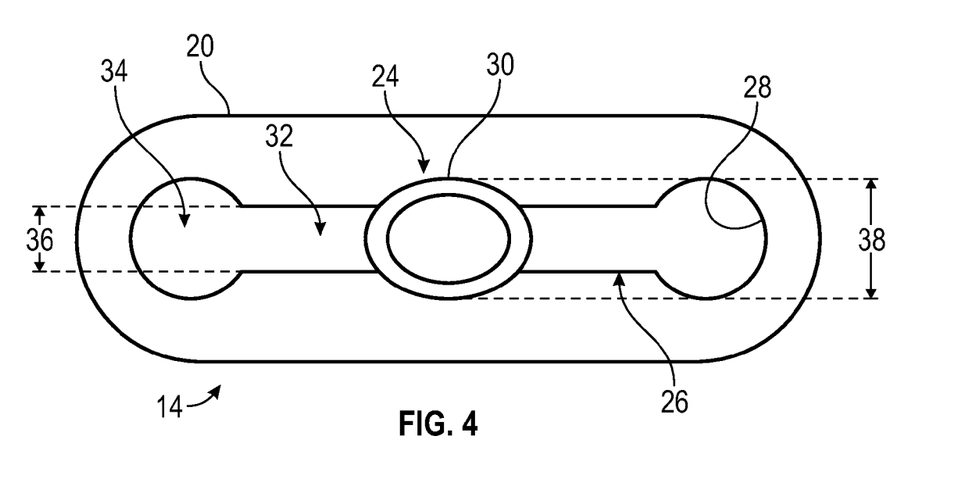
FIG. 4 is a plan view of engagement between the second component and the third component according to another aspect of the invention.

The elastically deformable second component 14 includes a cutout portion 26 defined by a cutout portion edge 28. The cutout portion 26 is configured to engage and receive the third component 24. More particularly, the cutout portion edge 28 engages an outer surface 30 of the third component 24 upon insertion of the third component 24 into the cutout portion 26 of the elastically deformable second component 14. The cutout portion 26 may be formed in numerous shapes and at various positions of the elastically deformable second component 14. In the illustrated embodiment, the cutout portion 26 comprises a neck section 32 and at least one outer bulb section 34. The neck section 32 is narrower than the at least one outer bulb section 34 and includes a neck section width 36 (FIG. 4).

The third component 24 may be formed in numerous geometries and in the illustrated embodiment comprises a substantially tubular member that may be solid or may include a hollow portion therein. Irrespective of the precise geometry of the third component 24, the third component 24 includes an outer surface width 38 that is greater than the neck section width 36. Although a single elastically deformable second component and a single third component are referenced, embodiments of the elastic mating assembly 10 include a plurality of elastically deformable second components and a plurality of third components, as will be described in detail below.

As will be apparent from the description herein, the elastically deformable nature of the elastically deformable second component, in combination with the particular orientations described above, facilitates precise alignment of the third component 24 (and any structures or components attached thereto) relative to the first component 12 by accounting for positional variation of the retaining and/or locating features of the first component 12 and/or the third component 24 that are inherently present due to manufacturing processes. The self-aligning benefits associated with the elastic mating assembly 10 will be described in detail below.

The third component 24 is positioned and engaged with the cutout portion 26 of the elastically deformable second component 14 upon translation of the third component 24 toward the elastically deformable second component 14, as well as the first component 12. More particularly, the outer surface 30 of the third component 24 engages the cutout portion edge 28 proximate the neck section 32. Subsequent translation results in an elastic deformation of the elastically deformable second component 14. Specifically, as noted above, the neck section width 36 is smaller than the outer surface width 38, thereby ensuring contact between the third component 24 and the neck section 28 of the elastically deformable second component 14.

In another embodiment (FIG. 4), the third component 24 is also at least partially formed of an elastically deformable material. In such an embodiment, the third component 24 is configured to elastically deform upon contact with the cutout portion 26 of the elastically deformable second component 14.

Any suitable elastically deformable material may be used for the elastically deformable second component 14, as well as the third component 24 in an elastically deformable embodiment. The term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Numerous examples of materials that may at least partially form the components include various metals, polymers, ceramics, inorganic materials or glasses, or composites of any of the aforementioned materials, or any other combinations thereof. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS), such as an ABS acrylic. The material may be in any form and formed or manufactured by any suitable process, including stamped or formed metal, composite or other sheets, forgings, extruded parts, pressed parts, castings, or molded parts and the like, to include the deformable features described herein. The material, or materials, may be selected to provide a predetermined elastic response characteristic of the elastically deformable second component 14 and the third component 24, if elastically deformable. The predetermined elastic response characteristic may include, for example, a predetermined elastic modulus.

The precise position where engagement between the outer surface 30 and the cutout portion 26 occurs will vary depending on positional variance imposed by manufacturing factors. Due to the elastically deformable properties of the elastic material comprising the elastically deformable second component 14, the criticality of the initial location of engagement is reduced. Further insertion of the third component 24 into the cutout portion 26 ultimately leads to a fully engaged position of the third component 24. In the fully engaged position, a tight, fitted engagement between the third component 24 and the first component 12 is achieved by contact interference between the outer surface 30 and the cutout portion edge 28. Such a condition is ensured by sizing the outer surface width 38 to be larger than the neck section width 36. The interference between the third component 24 and the cutout portion 26 causes elastic deformation proximate cutout portion 26 and the third component 24, whether the third component 24 is comprised of an elastically deformable material or not. The malleability of the materials reduces issues associated with positional variance.

In one embodiment, the first component 12 may include a plurality of apertures configured to receive a plurality of elastically deformable second components. Additionally, a plurality of third components may be included. The plurality of third components may be removably engaged within a single cutout portion of a single elastically deformable second component and/or may be removably engaged within distinct cutout portions of the plurality of elastically deformable second components. The elastic deformation of the plurality of elastically deformable second components elastically averages any positional errors of the first component 12 and the third component 24. In other words, gaps and/or misalignment that would otherwise be present due to positional errors associated with portions or segments of the first component 12 and the third component 24, particularly locating and retaining features. Specifically, the positional variance of each third component 24 is offset by the remaining third components to average in aggregate the positional variance of each component. Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, the disclosure of which is incorporated by reference herein in its entirety. The embodiments disclosed above provide the ability to convert an existing component that is not compatible with the above-described elastic averaging principles to an assembly that does facilitate elastic averaging and the benefits associated therewith.

Figure 5:
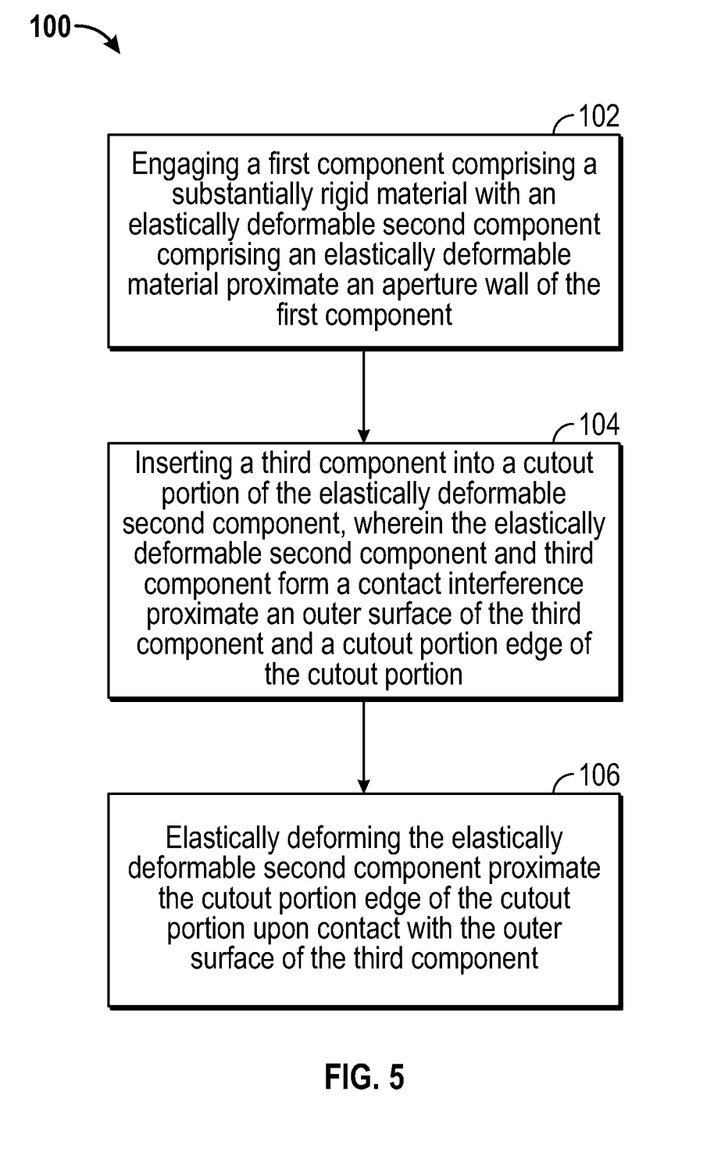
FIG. 5 is a flow diagram illustrating a method of elastically assembling matable components of the elastic mating assembly.

A method of elastically assembling matable components 100 is also provided, as illustrated in FIG. 5, and with reference to FIGS. 1-4. The elastic mating assembly 10, and more specifically the elastically deformable nature of the elastically deformable second component 14, has been previously described and specific structural components need not be described in further detail. The method 100 includes engaging 102 the first component 12 with the elastically deformable second component 14 proximate the aperture wall 18 of the first component 12. The method 100 also includes inserting 104 the third component 24 into the cutout portion 26 of the elastically deformable second component 14, wherein the elastically deformable second component 14 and the third component 24 form a contact interference proximate the outer surface 30 of the third component 24 and the cutout portion edge 28. The method 100 further includes elastically deforming 106 the elastically deformable second component 14 proximate the cutout portion edge 28 of the cutout portion 26 upon contact with the outer surface 30 of the third component 24.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastic mating assembly comprising:
   a first component comprising a substantially rigid material and an aperture defined by an aperture wall;
   an elastically deformable second component comprising:
      a cutout portion extending in an elongated manner, the cutout portion including a neck section, a first bulb section located at a first end of the cutout portion and a second bulb section located at a second end of the cutout portion, wherein the neck section comprises a neck section width and the first and second bulb sections include bulb section widths greater than the neck section width; and
      a second component outer wall forming a perimeter of the second component, the second component outer wall removably engaged with the aperture wall, wherein the elastically deformable second component is disposed within the aperture based on engagement about the entire perimeter of the second component with the aperture wall; and
   a third component removably engaged with the cutout portion of the elastically deformable second component, wherein the elastically deformable second component is configured to elastically deform proximate the cutout portion upon contact with an outer surface of the third component, wherein the third component comprises an elastically deformable material configured to elastically deform upon contact with the cutout portion of the elastically deformable second component, the third component having an outer surface width, wherein the outer surface width is greater than the neck section width of the cutout portion of the second component.

2. The elastic mating assembly of claim 1, wherein the second component outer wall comprises a perimeter notch configured to fittingly receive the aperture wall therein.

3. The elastic mating assembly of claim 1, wherein the aperture wall of the first component comprises a notch configured to fittingly receive the second component outer wall therein.

4. The elastic mating assembly of claim 1, wherein the substantially rigid material comprises a sheet metal.

5. The elastic mating assembly of claim 1, wherein the third component comprises a solid member.

6. The elastic mating assembly of claim 1, wherein the third component comprises a hollow tubular member.

7. The elastic mating assembly of claim 1, further comprising a contact interference condition proximate an interface between the outer surface of the third component and the neck section of the cutout portion of the elastically deformable second component.

8. The elastic mating assembly of claim 1, further comprising a plurality of third components removably engaged with the cutout portion of the elastically deformable second component.

9. The elastic mating assembly of claim 1, further comprising a plurality of elastically deformable second components removably engaged with the first component.

10. The elastic mating assembly of claim 9, wherein the plurality of elastically deformable second components are removably engaged with a plurality of apertures of the first component.

11. The elastic mating assembly of claim 10, further comprising a plurality of third components removably engaged with a corresponding cutout portion defined by each of the plurality of elastically deformable second components.

12. The elastic mating assembly of claim 11, further comprising a fully engaged position of the plurality of the third components, wherein the fully engaged position comprises contact interference between the outer surface of each of the plurality of third components and the cutout portion of the plurality of elastically deformable second components, wherein respective positional deviations from respective nominal alignment positions of the first component, the second component and the third component is averaged.

13. A method of elastically assembling matable components comprising:
engaging a first component comprising a substantially rigid material with an elastically deformable second component comprising an elastically deformable material proximate an aperture wall of the first component about an entire perimeter of the second component;
inserting a third component that is formed of an elastically deformable material into a cutout portion of the elastically deformable second component, wherein the elastically deformable second component and the elastically deformable third component form a contact interference proximate an outer surface of the third component and a cutout portion edge of the cutout portion; and
elastically deforming the elastically deformable second component proximate the cutout portion edge of the cutout portion upon contact with the outer surface of the third component extending in an elongated manner, the cutout portion including a neck section, a first bulb section located at a first end of the cutout portion and a second bulb section located at a second end of the cutout portion, wherein the neck section comprises a neck section width and the first and second bulb sections include bulb section widths greater than the neck section width, the bulb sections providing additional flexibility for the neck section to deform.

14. The method of claim 13, further comprising performing an elastic averaging of the elastic deformation over a plurality of elastically deformable second components, wherein upon reaching a fully engaged position of a plurality of third components a fitted alignment between the third component and the first component is established.

15. The method of claim 13, wherein engaging the first component with the elastically deformable second component comprises fittingly engaging the aperture wall within a perimeter notch formed in the elastically deformable second component.

16. The method of claim 13, wherein engaging the first component with the elastically deformable second component comprises fittingly engaging a second component outer wall within a notch formed in the aperture wall.

* * * * *